(12) United States Patent
Ward et al.

(10) Patent No.: US 11,549,558 B2
(45) Date of Patent: Jan. 10, 2023

(54) ISOLATOR DECOUPLER

(71) Applicant: GATES CORPORATION, Denver, CO (US)

(72) Inventors: Peter Ward, Farmington Hills, MI (US); Xiaohua Joe Chen, Windsor (CA); Charles M. Sendegeya, Windsor (CA); Alexander Serkh, Troy, MI (US); Yahya Hodjat, Oxford, MI (US); Essie Rahdar, Costa Mesa, CA (US); Wanzhi Han, Windsor (CA)

(73) Assignee: Gates Corporation, Denver, CO (US)

(*) Notice: Subject to any disclaimer, the term of this patent is extended or adjusted under 35 U.S.C. 154(b) by 1129 days.

(21) Appl. No.: 16/155,668

(22) Filed: Oct. 9, 2018

(65) Prior Publication Data

US 2020/0040947 A1 Feb. 6, 2020

Related U.S. Application Data

(63) Continuation-in-part of application No. 16/052,291, filed on Aug. 1, 2018, now abandoned.

(51) Int. Cl.
*F16D 7/02* (2006.01)
*F16D 3/12* (2006.01)
(Continued)

(52) U.S. Cl.
CPC .............. *F16D 7/022* (2013.01); *F16D 3/12* (2013.01); *F16D 3/72* (2013.01); *F16D 41/206* (2013.01);
(Continued)

(58) Field of Classification Search
CPC ... F16D 7/022; F16D 3/12; F16D 3/72; F16D 41/206; F16D 2250/0076; F16D 2300/22;
(Continued)

(56) References Cited

U.S. PATENT DOCUMENTS

| | | | |
|---|---|---|---|
| 3,968,702 A | 7/1976 | Beaudoin et al. | |
| 4,095,479 A | 6/1978 | Lundberg | |

(Continued)

FOREIGN PATENT DOCUMENTS

| | | |
|---|---|---|
| WO | 2005057037 A1 | 6/2005 |
| WO | 2007121582 A1 | 11/2007 |
| WO | 2011160208 A1 | 12/2011 |

OTHER PUBLICATIONS

European Patent Office, International Search Report and Written Opinion of the International Searching Authority, International application No. PCT/US2019/044170, dated Oct. 7, 2019.

*Primary Examiner* — David J Hlavka
(74) *Attorney, Agent, or Firm* — Alyssa K. Sandrowitz, Esq.; Kevin J. Aiken, Esq.

(57) ABSTRACT

An isolator decoupler comprising a shaft, a pulley journalled to the shaft, a one-way clutch engaged with the shaft, a spring carrier engaged with the one-way clutch, the spring carrier having a spring carrier surface, a torsion spring having a first end laser welded to the pulley and a second end laser welded to the spring carrier, the torsion spring having a volute with a width w, an annular spring support member having a spring support member outside surface, the annular spring support member independently moveable from the spring carrier and independently moveable from the shaft, a gap g between the annular spring support member and the spring carrier, the gap g being less than the width w, the first end comprising a first end coil, the first end coil bearing upon the spring support member outside surface, the first end coil laser welded to the spring support member outside surface, a torsion spring radial contraction limited by engagement with the spring carrier surface, and the gap g and the width w have a relationship $(w-2r)>(g+c1+c2)$ were $g>0$.

13 Claims, 4 Drawing Sheets

(51) Int. Cl.
*F16D 3/72* (2006.01)
*F16D 41/20* (2006.01)
*F16H 55/36* (2006.01)

(52) U.S. Cl.
CPC ..... *F16H 55/36* (2013.01); *F16D 2250/0076* (2013.01); *F16D 2300/22* (2013.01); *F16H 2055/366* (2013.01)

(58) Field of Classification Search
CPC ........... F16D 41/064; F16D 2250/0061; F16H 55/36; F16H 2055/366
See application file for complete search history.

(56) References Cited

U.S. PATENT DOCUMENTS

| | | | |
|---|---|---|---|
| 4,102,214 A | 7/1978 | Hoff | |
| 4,943,264 A | 7/1990 | Whiteman, Jr. | |
| 5,052,981 A | 10/1991 | Robert | |
| 5,139,463 A | 8/1992 | Bytzek et al. | |
| 5,149,309 A | 9/1992 | Guimbretiere | |
| 5,156,573 A | 10/1992 | Bytzek et al. | |
| 5,326,330 A | 7/1994 | Bostelmann | |
| 5,598,913 A | 2/1997 | Monahan et al. | |
| 6,044,943 A | 4/2000 | Bytzek et al. | |
| 6,083,130 A | 7/2000 | Mevissen et al. | |
| 6,394,248 B1 | 5/2002 | Monahan et al. | |
| 6,761,656 B2 | 7/2004 | King et al. | |
| 6,923,303 B2 | 8/2005 | Liston et al. | |
| 7,007,780 B2 | 3/2006 | Arnold et al. | |
| 7,052,420 B2 | 5/2006 | King et al. | |
| 7,153,227 B2 | 12/2006 | Dell et al. | |
| 7,207,910 B2 | 4/2007 | Dell et al. | |
| 7,618,337 B2 | 11/2009 | Jansen et al. | |
| 7,712,592 B2 | 5/2010 | Jansen et al. | |
| 7,766,774 B2 | 8/2010 | Antchak et al. | |
| 7,850,557 B2 | 12/2010 | Moriya et al. | |
| 7,878,315 B2 | 2/2011 | Saito et al. | |
| 7,975,821 B2 | 7/2011 | Antchak et al. | |
| 8,006,819 B2 | 8/2011 | Dell et al. | |
| 8,021,253 B2 | 9/2011 | Dell et al. | |
| 8,177,669 B2 | 5/2012 | Ishida et al. | |
| 8,192,312 B2 | 6/2012 | Ali et al. | |
| 8,419,574 B2 | 4/2013 | Serkh et al. | |
| 8,506,434 B2 | 8/2013 | Harvey | |
| 8,602,928 B2 | 12/2013 | Serkh et al. | |
| 8,678,157 B2 * | 3/2014 | Ward | F16D 7/022 474/94 |
| 8,931,610 B2 | 1/2015 | Serkh | |
| 9,033,832 B1 | 5/2015 | Serkh et al. | |
| 9,759,266 B1 * | 9/2017 | Serkh | F16D 3/12 |
| 9,797,469 B1 * | 10/2017 | Serkh | F16H 7/0827 |
| 2002/0183147 A1 | 12/2002 | Fujiwara | |
| 2006/0035740 A1 | 2/2006 | Lehtovaara et al. | |
| 2006/0144664 A1 | 7/2006 | Antchak et al. | |
| 2006/0264280 A1 | 11/2006 | Dell et al. | |
| 2007/0254756 A1 | 11/2007 | Kawamoto | |
| 2008/0207364 A1 | 8/2008 | Schebitz et al. | |
| 2009/0176583 A1 | 7/2009 | Dell et al. | |
| 2009/0176608 A1 | 7/2009 | Jansen et al. | |
| 2009/0197719 A1 | 8/2009 | Ali et al. | |
| 2010/0116617 A1 | 5/2010 | Serkh et al. | |
| 2011/0065537 A1 | 3/2011 | Serkh et al. | |
| 2011/0224038 A1 | 9/2011 | Aantchak et al. | |
| 2011/0245000 A1 | 10/2011 | Serkh et al. | |
| 2012/0088616 A1 | 4/2012 | Ali et al. | |
| 2013/0150191 A1 | 6/2013 | Ishida | |
| 2015/0285366 A1 * | 10/2015 | Serkh | F16D 3/72 474/94 |
| 2015/0345575 A1 | 12/2015 | Antchak et al. | |
| 2017/0298995 A1 | 10/2017 | Serkh et al. | |

\* cited by examiner

ISOLATOR DECOUPLER

REFERENCE TO RELATED APPLICATIONS

This application is a continuation-in-part and claims priority from copending U.S. application Ser. No. 16/052,291 filed Aug. 1, 2018.

FIELD OF THE INVENTION

The invention relates to an isolator decoupler, and more particularly, to an isolator decoupler having a annular spring support member having a spring support member outside surface, the annular spring support member independently moveable from a spring carrier.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Isolator decouplers are typically assembled with interference or press fits between components. In other cases mechanical connections are used, such as a tang engaged with a receiving groove. In still other cases some use of welding is known combined with use of discrete components. Components include bearings, pulleys and shafts.

Representative of the art is U.S. Pat. No. 9,759,266 which discloses an isolating decoupler comprising a shaft, a pulley journalled to the shaft, a torsion spring, the torsion spring comprising a flat surface planar in a plane normal to the rotation axis A-A on each end of the torsion spring, a one-way clutch engaged between the torsion spring and the shaft, a weld bead joining a torsion spring end to the one-way clutch, and a weld bead joining the other torsion spring end to the pulley.

What is needed is an isolator decoupler having a annular spring support member having a spring support member outside surface, the annular spring support member independently moveable from a spring carrier. The present invention meets this need.

SUMMARY OF THE INVENTION

The primary aspect of the invention is an isolator decoupler having a annular spring support member having a spring support member outside surface, the annular spring support member independently moveable from a spring carrier.

Other aspects of the invention will be pointed out or made obvious by the following description of the invention and the accompanying drawings.

The invention comprises an isolator decoupler comprising a shaft, a pulley journalled to the shaft, a one-way clutch engaged with the shaft, a spring carrier engaged with the one-way clutch, the spring carrier having a spring carrier surface, a torsion spring having a first end attached to the pulley and a second end attached to the spring carrier, a annular spring support member having a spring support member outside surface, the annular spring support member independently moveable from the spring carrier, the first end bearing upon the spring support member outside surface, and a torsion spring radial contraction limited by engagement with the spring carrier surface.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
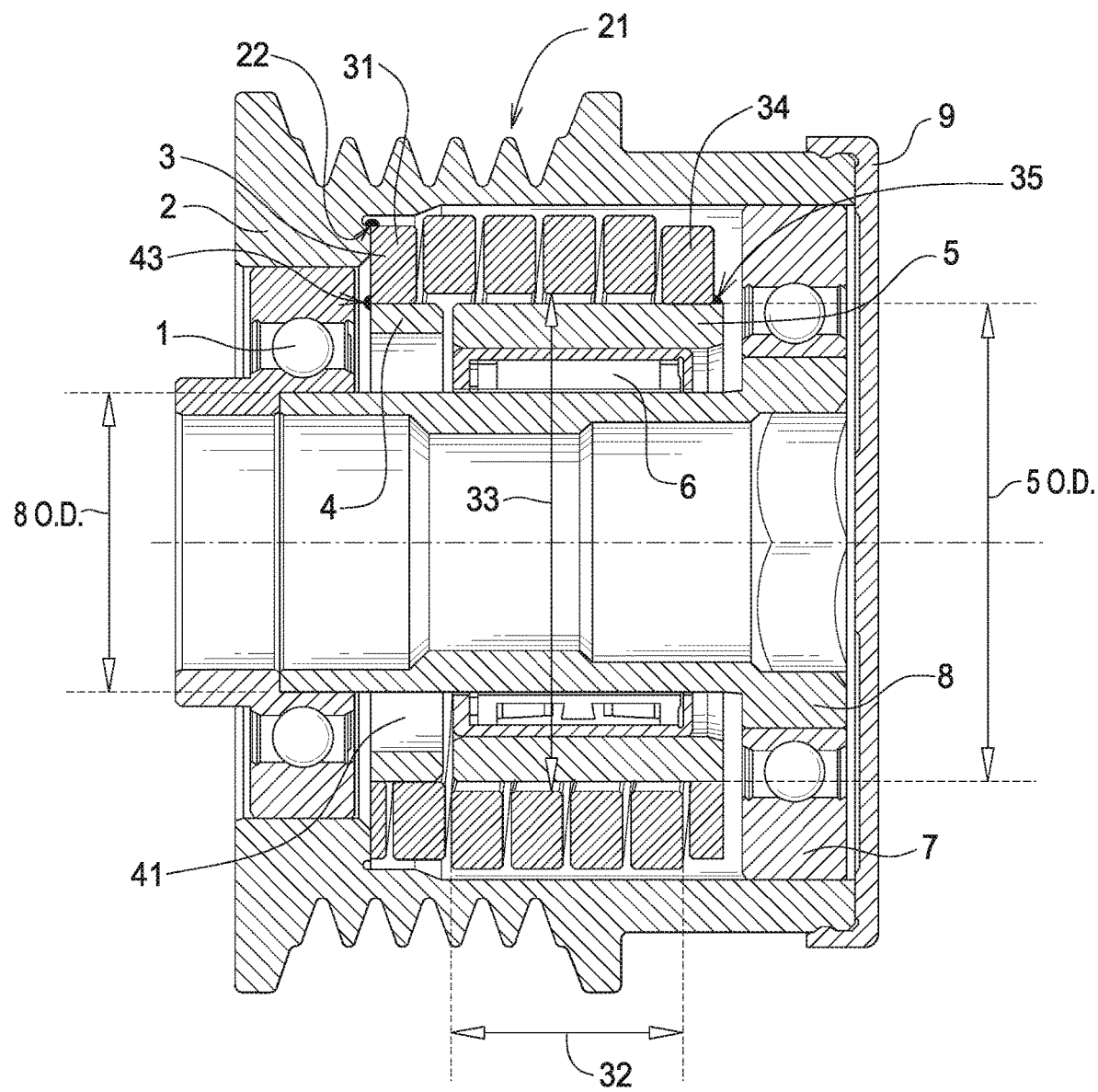
FIG. 1 is a cross-section view.

FIG. 1 is a cross-section view. The inventive device comprises a shaft 8 to which a pulley 2 is journalled with bearing 1 and bearing 7. A multi-ribbed belt engages belt bearing surface 21 of pulley 2. Bearing 1 and bearing 7 may comprise any suitable bearing known in the art such as ball, needle, sleeve or roller. Shaft 8 can be used to attach the inventive device to an alternator shaft (not shown). Alternators are typically used in internal combustion engines (not shown) and are known.

Torsion spring 3 is engaged between pulley 2 and spring carrier 5. A one-way clutch 6 is engaged between spring carrier 5 and shaft 8. One-way clutch 6 allows relative rotation of pulley 2 with respect to shaft 8 while preventing relative rotation in the opposite direction.

Dust cover 9 prevents debris from entering the device.

Power is transmitted from pulley 2 to shaft 8 through spring 3. One-way clutch 6 is locked in the power transmission direction. Spring 3 is loaded in the winding direction, thereby causing coils 32 to radially contract slightly under load. Radial contraction of coils 32 is ultimately limited by engagement of spring 3 with surface 51.

An end 31 of spring 3 is engaged with and bears upon surface 42. End 31 comprises approximately one coil of spring 3. The device rotates about longitudinal axis A-A to drive an alternator (not shown).

Member 4 comprises an inside diameter (4 I.D.). Inside diameter (4 I.D.) exceeds the outside diameter (8 O.D.) of shaft 8. Outside diameter (4 O.D.) of member 4 is the same as outside diameter (5 O.D.) of carrier 5. Member 4 does not bear upon nor engage shaft 8. Member 4 does not engage and is separate from carrier 5 which allows independent relative movement between member 4 and carrier as operating conditions may require. Hence, there is clear space 41 between member 4 and shaft 8 rendering member 4 independently movable with respect to shaft 8. In effect member 4 "floats" and its position is located solely by virtue of the members engagement with a coil of end 31 of spring 3. Member 4 is engaged circumferentially with approximately 270 degrees of an end 31 coil whereby member 4 radially supports a coil of end 31. The supported length of end 31 may be from approximately 270 degrees to up to approximately one full coil or approximately 360 degrees.

In an unstressed condition free coils 32 do not come into contact with surface 51. This is because inside diameter 33 of spring 3 exceeds the outside diameter (5 O.D.) of carrier 5. During certain operating conditions free coils 32 of spring 3 temporarily come into contact with surface 51, thereby limiting a radial contraction of spring 3. Once the load condition causing the radial contraction is relieved, coils 32 of spring 3 disengage from surface 51.

End 31 of spring 3 is attached to pulley 2 at bead 22 and to member surface 42 at bead 43, each by weld or adhesives. Bead 22 may be less than approximately 180 degrees in length or up to 360 degrees in length depending upon the design conditions for the device. End 34 is attached to carrier surface 51 at bead 35 by weld or adhesives. The connection at each bead 22, 35, 43 may be welded by for example, laser, MIG, TIG or SMAW. Adhesives may also be used as well for each bead 22, 35, 43. Adhesives can include for example, epoxies, aircraft/aerospace adhesives, acrylics, ceramics and cyanoacrylates.

End 34 comprises a partial or full coil of spring 3. Bead 35 extends approximately 180 degrees circumferentially to attach end 34 to carrier 5. However, bead 35 may be less than approximately 180 degrees in length or up to 360 degrees in length depending upon the operating requirements for the device.

End 31 comprises a partial or full coil of spring 3. Bead 43 extends approximately 180 degrees circumferentially to attach end 31 to member 4. However, bead 43 may be less than approximately 180 degrees in length or up to 360 degrees in length depending upon the design conditions for the device. Bead 43 need only be long enough to suitably attach end 31 to member 4 for a given operating condition, which in some applications may only require a tack weld for bead 43.

The coils between end 31 and end 34 are free coils 32.

Figure 2:
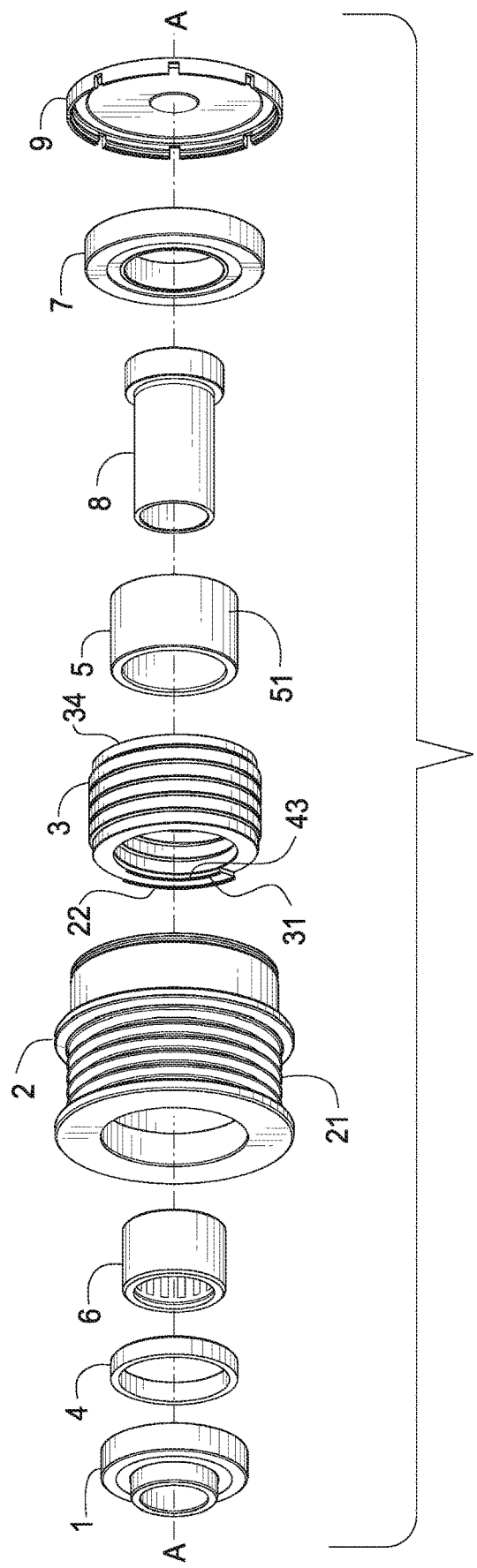
FIG. 2 is an exploded view.

FIG. 2 is an exploded view. Bearing 1 is press fit on an end of shaft 8. Bearing 7 is press fit on another end of shaft 8.

Figure 3:
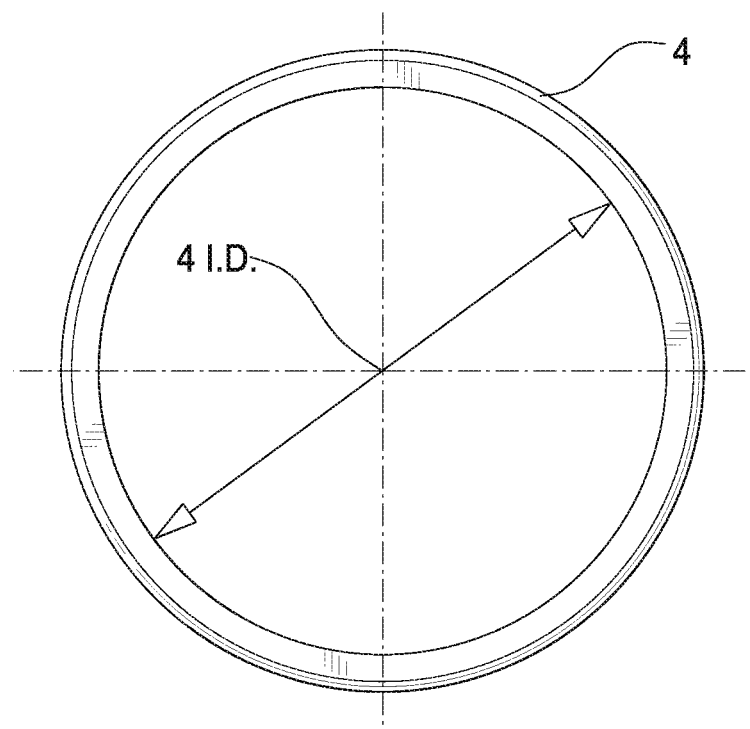
FIG. 3 is a side view of the spring support member.

FIG. 3 is a side view of the spring support member. Member 4 is annular in form. Member 4 comprises an inside diameter (4 I.D.).

Figure 4:
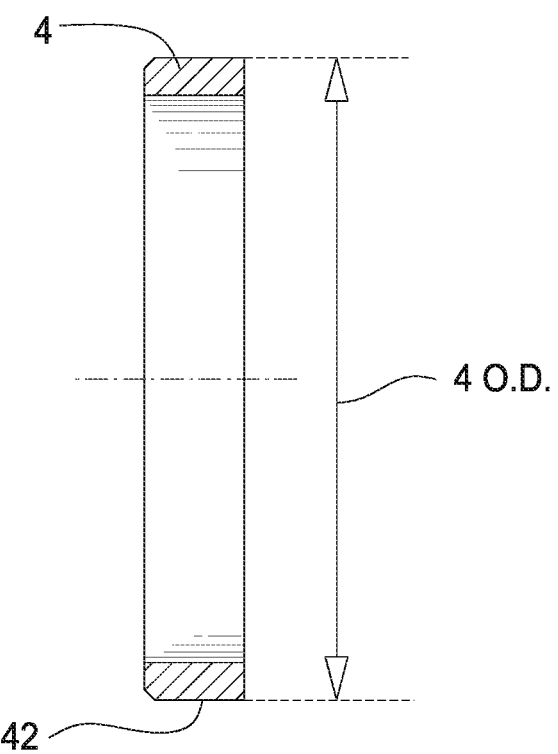
FIG. 4 is a cross section view of the spring support member.

FIG. 4 is a cross section view of the spring support member. Member 4 comprises a rectangular cross section in order to support end 31. The constituent wire of spring 3 comprises a rectangular cross section. End 31 bears upon and is radially supported by outer surface 42. Surface 42 comprises an outside diameter (4 O.D.).

Surface 42 of annular member 4 has two functions. One is to radially support end 31 of spring 3. By bearing upon member 4, end 31 of spring 3 is kept in a preferred annular form. The second function is to limit the radial travel of active coils 32 of spring 3. Surface 51 of carrier 5 also limits the radial inward travel of active coils 32. Stopping radial inward travel of free coils 32 at surface 51 prevents spring 3 from being overstressed in a loaded condition. The combined effect of surface 42 and surface 51 is to provide continuous support for the full axial length and therefore all coils of spring 3 during an overstress condition. Uniform support of coils 32 is realized since the outside diameter (4 O.D.) of surface 42 which equivalent to the outside diameter (5 O.D.) of surface 51. Uniform support enhances the operating life of the device by minimizing the effects of a spring overstress condition during engine and alternator transients. Once a temporary overstress condition abates, coils 32 of spring 3 radially expand and thereby cease contact with surface 51.

Figure 5:
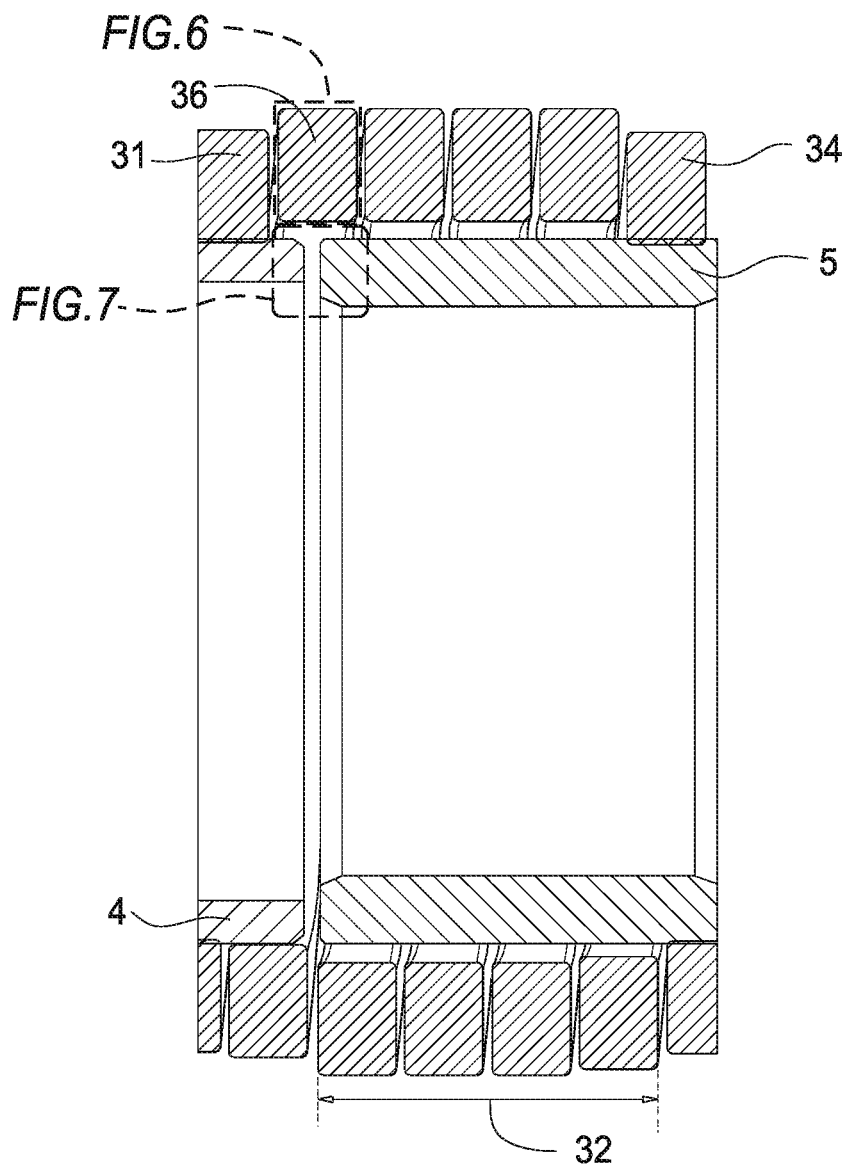
FIG. 5 is a cross-section of the device.

FIG. 5 is a cross-section of the device. In this detail the relationship between spring volute 36, carrier 5 and annular member 4 is shown. A gap "g" is present between member 4 and carrier 5. "g" is greater than zero meaning carrier 5 and member 4 are not typically in contact. This allows free rotational and axial movement of member 4 with respect to carrier 5.

During operation, to ensure that volute 36 cannot radially contract below 5 O.D. the distance between member 4 and carrier 5 must satisfy the following criteria:

$$(w-2r)>(g+c1+c2) \text{ were } g>0$$

w is the width of the volute 36 wire.
r is the radius of the corner of the volute wire
g is the gap width
c1 is the axial chamfer width of member 4
c2 is the axial chamfer width of carrier 5

As one can see as c1, c2 and r approach zero the relationship reduces to w>g.

A gap g between member 4 and carrier 5 must exist to ease operation, but g cannot be so large that the spring volute 36 can force its way in between member 4 and carrier 5. If the radial force of the spring and volute contracting during operation isn't supported by member 4 and carrier 5, then spring 3 can push carrier 5 away from member 4 thereby becoming caught in gap g. This is detrimental to operational longevity and will alter operational characteristics since it will result in "dead" coils, and/or a changed spring rate and an overstressed spring.

Figure 6:
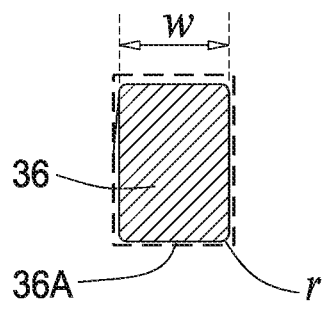
FIG. 6 is a detail of FIG. 5.

FIG. 6 is a detail of FIG. 5.

Figure 7:
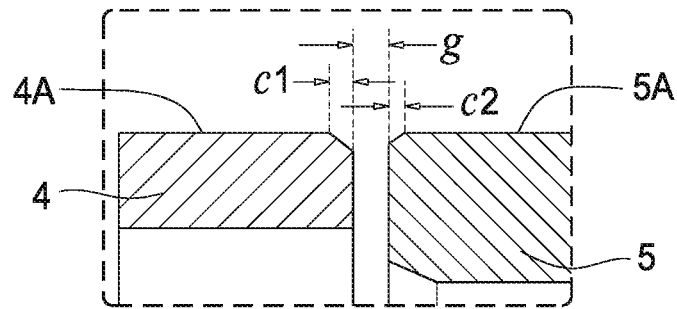
FIG. 7 is a detail of FIG. 5.

FIG. 7 is a detail of FIG. 5. Flat surface 36A bears upon flat surface 4A and flat surface 5A. It is preferable that these flat surfaces bear directly upon each other in order to avoid a mechanical advantage being realized if a chamfered surface engages a component. For example, if gap g is too large, a chamfer on volute 36 may allow volute to "pry" or emplace itself into gap g between member 4 and carrier 5. Engagement of the noted flat surfaces 36A, 4A and 5A helps in part to prevent this from occurring.

An isolator decoupler comprising a shaft, a pulley journalled to the shaft, a one-way clutch engaged with the shaft, a spring carrier engaged with the one-way clutch, the spring carrier having a spring carrier surface, a torsion spring having a first end attached to the pulley and a second end attached to the spring carrier, an annular spring support member having a spring support member outside surface, the annular spring support member independently moveable from the spring carrier, the first end bearing upon the spring support member outside surface, and a torsion spring radial contraction limited by engagement with the spring carrier surface.

An isolator decoupler comprising a shaft, a pulley journalled to the shaft, a one-way clutch engaged with the shaft, a spring carrier engaged with the one-way clutch, the spring carrier having a spring carrier surface, a torsion spring having a first end welded to the pulley and a second end welded to the spring carrier, an annular spring support member having a spring support member outside surface, the annular spring support member independently moveable from the spring carrier and independently moveable from the shaft, the first end comprising a first end coil, the first end coil bearing upon the spring support member outside surface, the first end coil attached to the spring support member outside surface, a spring carrier surface outside diameter and a spring support member outside surface outside diameter being approximately equal, and a torsion spring radial contraction limited by engagement with the spring carrier surface.

An isolator decoupler comprising a shaft, a pulley journalled to the shaft, a one-way clutch engaged with the shaft, a spring carrier engaged with the one-way clutch, the spring carrier having a spring carrier surface, a torsion spring having a first end laser welded to the pulley and a second end laser welded to the spring carrier, the torsion spring having a volute with a width w, an annular spring support member having a spring support member outside surface, the annular spring support member independently moveable from the spring carrier and independently moveable from the shaft, a gap g between the annular spring support member and the spring carrier, the gap g being less than the width w, the first end comprising a first end coil, the first end coil bearing upon the spring support member outside surface, the first end coil laser welded to the spring support member outside surface, a torsion spring radial contraction limited by engagement with the spring carrier surface, and the gap g and the width w have a relationship (w−2r)>(g+c1+c2) were g>0.

Although a form of the invention has been described herein, it will be obvious to those skilled in the art that variations may be made in the construction and relation of parts without departing from the spirit and scope of the invention described herein. Unless otherwise specifically noted, components depicted in the drawings are not drawn to scale. Further, it is not intended that any of the appended claims or claim elements invoke 35 U.S.C. § 112(f) unless the words "means for" or "step for" are explicitly used in the particular claim. The present disclosure should in no way be limited to the exemplary embodiment or numerical dimensions illustrated in the drawings and described herein.

We claim:

1. An isolator decoupler comprising:
   a shaft;
   a pulley journalled to the shaft;
   a one-way clutch engaged with the shaft;
   a spring carrier engaged with the one-way clutch, the spring carrier having a spring carrier surface;
   a torsion spring having a first end welded to the pulley and a second end welded to the spring carrier, the torsion spring having a volute with a width w;
   an annular spring support member having a spring support member outside surface, the annular spring support member independently moveable from the spring carrier and independently moveable from the shaft;
   a gap g between the annular spring support member and the spring carrier;
   the gap g being less than the width w;
   the first end comprising a first end coil, the first end coil bearing upon the spring support member outside surface, the first end coil attached to the spring support member outside surface;
   a spring carrier surface outside diameter and a spring support member outside surface outside diameter being approximately equal; and
   a torsion spring radial contraction limited by engagement with the spring carrier surface.

2. The isolator decoupler as in claim 1, wherein the annular spring support member is only connected to the first end.

3. The isolator decoupler as in claim 1, wherein the pulley comprises a belt bearing surface.

4. The isolator decoupler as in claim 1, wherein the pulley is journalled to the shaft on a first bearing and a second bearing.

5. The isolator decoupler as in claim 1, further comprising a dust cover.

6. The isolator decoupler as in claim 1, wherein a radial contraction of the first end coil is limited upon engagement with the spring support member outside surface.

7. The isolator decoupler as in claim 1, wherein the first end is laser welded to the pulley and the second end is laser welded to the spring carrier.

8. The isolator decoupler as in claim 1, wherein the first end coil is laser welded to the spring support member outside surface.

9. An isolator decoupler comprising:
   a shaft;
   a pulley journalled to the shaft;
   a one-way clutch engaged with the shaft;
   a spring carrier engaged with the one-way clutch, the spring carrier having a spring carrier surface;
   a torsion spring having a first end laser welded to the pulley and a second end laser welded to the spring carrier, the torsion spring having a volute with a width w;
   an annular spring support member having a spring support member outside surface, the annular spring support member independently moveable from the spring carrier and independently moveable from the shaft;
   a gap g between the annular spring support member and the spring carrier, the gap g being less than the width w;
   the first end comprising a first end coil, the first end coil bearing upon the spring support member outside surface, the first end coil laser welded to the spring support member outside surface; and
   a torsion spring radial contraction limited by engagement with the spring carrier surface.

10. The isolator decoupler as in claim 9, wherein:
    the gap g and the width w have a relationship $(w-2r)>(g+c1+c2)$ were, $g>0$,
    r is the radius of a corner of the volute,
    c1 is an axial chamfer width of the annular spring support member,
    c2 is an axial chamfer width of the spring carrier.

11. An isolator decoupler comprising:
    a shaft;
    a pulley journalled to the shaft;
    a one-way clutch engaged with the shaft;
    a spring carrier engaged with the one-way clutch, the spring carrier having a spring carrier surface;
    a torsion spring having a first end laser welded to the pulley and a second end laser welded to the spring carrier, the torsion spring having a volute with a width w;
    an annular spring support member having a spring support member outside surface, the annular spring support member independently moveable from the spring carrier and independently moveable from the shaft;
    a gap g between the annular spring support member and the spring carrier, the gap g being less than the width w;
    the first end comprising a first end coil, the first end coil bearing upon the spring support member outside surface, the first end coil laser welded to the spring support member outside surface;
    a torsion spring radial contraction limited by engagement with the spring carrier surface; and the gap g and the width w have a relationship $(w-2r) > (g+c_1+c_2)$ were $g>0$.

12. The isolator decoupler as in claim 11, wherein r is a radius of a corner of the volute, $c_1$ is an axial chamfer width of the annular spring support member, and $c_2$ is an axial chamfer width of the spring carrier.

13. The isolator decoupler as in claim 11, wherein the gap g is less than the width w sufficient to prevent emplacement of a volute within gap g.

* * * * *